United States Patent
Horn et al.

(10) Patent No.: US 12,516,722 B2
(45) Date of Patent: Jan. 6, 2026

(54) BELT TENSIONING ROLLER SET AND METHOD FOR PRODUCING BELT TENSIONING ROLLERS

(71) Applicant: Schaeffler Technologies AG & Co. KG, Herzogenaurach (DE)

(72) Inventors: Maik Horn, Strullendorf (DE); Christoph Strohmeyer, Nuremberg (DE); Harald Hofmann, Herzogenaurach (DE); Thomas Papke, Rückersdorf (DE); Dominic Bartels, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/711,551

(22) PCT Filed: Sep. 16, 2022

(86) PCT No.: PCT/DE2022/100694
§ 371 (c)(1),
(2) Date: May 17, 2024

(87) PCT Pub. No.: WO2023/088510
PCT Pub. Date: May 25, 2023

(65) Prior Publication Data
US 2025/0012349 A1   Jan. 9, 2025

(30) Foreign Application Priority Data
Nov. 18, 2021 (DE) .......................... 102021130125.4

(51) Int. Cl.
*F16H 55/36* (2006.01)
*B33Y 80/00* (2015.01)

(52) U.S. Cl.
CPC .............. *F16H 55/36* (2013.01); *B33Y 80/00* (2014.12); *F16H 2055/366* (2013.01)

(58) Field of Classification Search
CPC ..... F16H 55/36; F16H 2055/366; F16H 55/48
See application file for complete search history.

(56) References Cited

U.S. PATENT DOCUMENTS 4,602,875 A * 7/1986 Doerr .................... F16C 13/006
                                                                384/488
5,797,819 A * 8/1998 Arai ........................ F16H 55/48
                                                                474/166

(Continued)

FOREIGN PATENT DOCUMENTS

| CN | 202326951 U | 7/2012 |
| DE | 3831769 A1 | 3/1990 |

(Continued)

OTHER PUBLICATIONS

European Patent Office, International Search Report received in International Application No. PCT/DE2022/100694, Nov. 7, 2022, 25 pages (including translation).

*Primary Examiner* — Anna M Momper
*Assistant Examiner* — Mark K Buse
(74) *Attorney, Agent, or Firm* — Suiter Swantz IP

(57) ABSTRACT

Different belt tensioning rollers (1) are produced according to a universal concept in that different belt tensioning roller (1) main parts (2), each of which has at least one reinforcing element (9, 14, 15) and each of which can be combined with a rolling bearing (10), are additively manufactured on the basis of a uniform roller basic design (GF) by making different modifications to the roller basic design (GF).

12 Claims, 4 Drawing Sheets

(56) References Cited

U.S. PATENT DOCUMENTS

| | | | |
|---|---|---|---|
| 9,085,846 B2* | 7/2015 | Garlatti | F16H 55/48 |
| 11,536,351 B2* | 12/2022 | Arnault | F16H 7/20 |
| 11,892,070 B2* | 2/2024 | Čepon | D06F 37/264 |
| 2014/0221140 A1* | 8/2014 | Garlatti | F16H 55/48 |
| | | | 474/190 |
| 2017/0036409 A1 | 2/2017 | Capoldi et al. | |
| 2023/0204092 A1* | 6/2023 | Čepon | D06F 37/264 |
| | | | 474/190 |

FOREIGN PATENT DOCUMENTS

| | | |
|---|---|---|
| DE | 102006039363 A1 | 3/2008 |
| DE | 102009038220 A1 | 2/2011 |
| DE | 102011003020 A1 | 7/2012 |
| DE | 102015118194 A1 | 4/2017 |
| DE | 102018115434 A1 | 1/2019 |
| DE | 102019132263 A1 | 5/2021 |
| DE | 102021002614 A1 | 12/2021 |
| JP | H09506692 A | 6/1997 |
| JP | 2009144813 A | 7/2009 |

* cited by examiner

BELT TENSIONING ROLLER SET AND METHOD FOR PRODUCING BELT TENSIONING ROLLERS

CROSS-REFERENCE TO RELATED APPLICATION

The present application is the U.S. National Phase of PCT Patent Application Number PCT/DE2022/100694, filed on Sep. 16, 2022, which claims priority to German Patent Application Serial Number 10 2021 130 125.4, filed on Nov. 18, 2021, the entire disclosures of which are incorporated by reference herein.

TECHNICAL FIELD

The disclosure relates to a method for producing belt tensioning rollers, which includes the generative production of at least part of the belt tensioning roller. The disclosure further relates to a set of at least partially generatively manufactured belt tensioning rollers for traction drives.

BACKGROUND

DE 10 2019 132 263 A1 describes a method for the additive production of a belt tensioning roller for a traction drive. A ring element of the belt tensioning roller has an outer peripheral surface intended for contacting a belt, i.e., a traction means, and an inner peripheral surface intended for receiving a bearing. At least part of the ring element is produced additively, i.e., generatively, and has nanoparticles. The nanoparticles can be distributed inhomogeneously in the additively produced part of the ring element and have a ceramic portion. A powder-based additive manufacturing method is proposed as a manufacturing technology in DE 10 2019 132 263 A1.

DE 38 31 769 A1 describes a roller for a belt drive, which comprises a carrier made of an electrically non-conductive polymeric material and an annular metal body. A contact surface for a belt running over the roller is provided by an electrically conductive material, which is electrically connected to the annular metal body.

DE 10 2006 039 363 A1 discloses a belt tensioning roller with a PVD coating. The PVD coating is disposed on a running surface of the belt tensioning roller intended for contacting a belt, and other components, including a bearing system of the belt tensioning roller, can also be PVD-coated.

DE 10 2011 003 020 A1 discloses a tensioning and/or deflection roller made of plastic with a nanocrystalline coating. The coating is disposed at least in sections on an outer peripheral surface of a main body, made of plastic, of the tensioning and/or deflection roller, which is intended for use in a traction drive.

DE 10 2009 038 220 A1 relates to a belt tensioning roller with an integrated oil-trap unit. Plastic injection molding and non-cutting forming of sheet metal are mentioned in DE 10 2009 038 220 A1 as possible manufacturing technologies for the production of components of belt tensioning rollers.

SUMMARY

The disclosure is based on the object of achieving progress in the production of belt tensioning rollers in relation to the prior art mentioned, with the aim of achieving a particularly high level of flexibility in production.

This object is achieved by a method for producing a belt tensioning roller according to claim 1. The object is also achieved by a set, according to claim 5, which is formed from belt tensioning rollers. The configurations and advantages of the disclosure explained below in connection with the device, i.e., the belt tensioning roller set, also apply mutatis mutandis to the production method, i.e., the generative manufacture, and vice versa.

The production method is based on a uniform basic roller shape of the belt tensioning rollers. On this basis, different main bodies of belt tensioning rollers, each having at least one reinforcement, can be produced generatively through various modifications.

The belt tensioning roller set comprises a plurality of different main bodies, each additively produced by the method according to claim 1, which are provided for receiving a rolling bearing, in particular a ball bearing, held in an inner wall of the main body, each main body having two cavities with a toroidal basic shape, namely an outer cavity delimited by a belt support wall and an inner cavity delimited by the inner wall.

Owing to the various modifications of the basic roller shape that can be implemented with little effort, a large number of different belt tensioning rollers can be provided, each designed to suit demands. In particular, even small-scale series can be produced efficiently, based on a uniform basic concept. A particular advantage is the fact that no over-dimensioning of rollers is necessary, which would be associated with unnecessarily high masses and moments of inertia. Conversely, in the case of small-scale production where there is particularly high material demand, for example in motor sports, sufficient reserves in terms of capacity can be made available by adapting reinforcements, with over-dimensioning of components also being reasonably avoided in such a case.

Reinforcements of the main body of belt tensioning rollers can in particular be in the form of reinforcing webs. Additionally or alternatively, reinforcements can be implemented in the form of an increase in wall thickness. In both cases, the main body can be constructed generatively from a powdery material, wherein openings for depowdering in the main body, which are open in the direction of the central axis of the main body, are excluded. The openings for depowdering can be designed in particular to be oval and funnel-shaped and ensure that as little powder as possible remains in the corners of cavities and that expansion options are only minimally affected by reinforcing webs.

Instead of a powdery material, a filament can in principle also be used to construct the main body, and the filament material can be constructed in a uniform or non-uniform manner, in particular with reinforcing fibers.

Individual rollers of the belt tensioning roller set can have reinforcing webs, in particular in the outer cavity of the main body. There are numerous possible variations when it comes to the shape and arrangement of these reinforcing webs. In particular, different reinforcing webs can be arranged alternately in the circumferential direction of the outer cavity.

To absorb particularly large radial forces, an additional reinforcement extending to the inner wall outside the two cavities can be disposed in each case in an extension of a reinforcement of the outer cavity. The additional reinforcing webs in particular help to absorb non-uniform loads, for example loads that are significantly greater near one end face of the belt tensioning roller than near the other end face.

According to various possible developments, the main body of the belt tensioning roller can have a rim on its belt support wall on one or both sides. The attachment of the rims in the context of generative manufacturing, i.e., 3D printing, is independent of the described ways in which the main body of the belt tensioning roller is reinforced. A one-sided rim can be attached in a production-friendly manner in such a way that overhangs are avoided and additional supporting structures for support during generative, layered production can be dispensed with, without having to accept any losses in terms of dimensional accuracy. Minimizing the volume of the 3D-printed part, which simultaneously eliminates or at least limits the need for finishing work, also contributes to a reduction in manufacturing time.

BRIEF DESCRIPTION OF THE DRAWINGS

Several exemplary embodiments of the disclosure are explained in more detail below by means of drawings. In the drawings.

DETAILED DESCRIPTION

Figure 1:
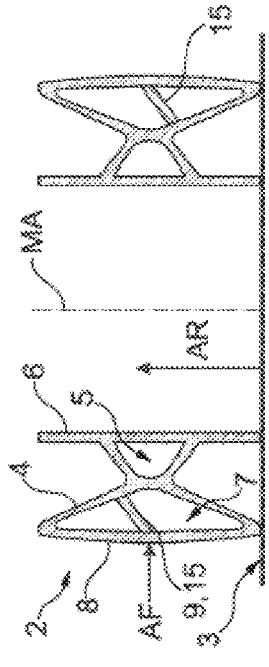
FIG. 1 shows a first exemplary embodiment of a main body of a belt tensioning roller for a belt drive in a sectional view.

Unless otherwise stated, the following explanations relate to all the exemplary embodiments. Parts that correspond to each other or have basically the same effect are denoted with the same reference signs in all the drawings.

A belt tensioning roller 1 comprises a main body 2 produced generatively from a powdery starting material, whether based on plastic or metal, and a rolling bearing 10, namely ball bearing, held in the main body 2. The rolling bearing 10 has an outer ring 11, a plurality of balls as rolling bodies 12, and an inner ring 13. A cage for guiding the balls 12 is not shown, nor are seals for sealing the rolling bearing 10. The outer ring 11 of the rolling bearing 10 contacts an inner wall 6, which is to be attributed to the wall of the main body 2, denoted overall by 4. The inner wall 6 delimits an inner cavity 5 of the main body 2. In addition, an outer cavity 7 is formed in the main body 2, which outer cavity is delimited, among other things, by a belt support wall 8, on which a belt rests during operation of the belt tensioning roller 1. As can be seen from the drawings, the belt support wall 8 has a spherical shape.

Figure 14:
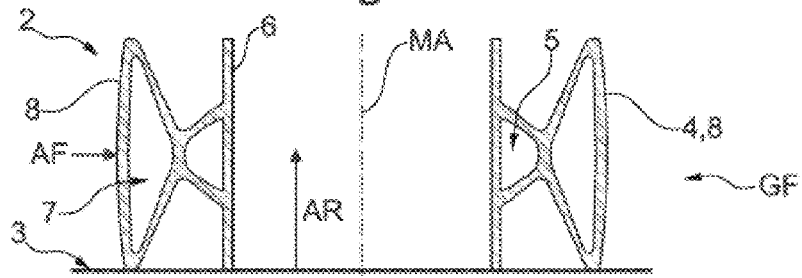
FIG. 14 shows the non-reinforced basic shape of a main body of a belt tensioning roller.
Figure 15:
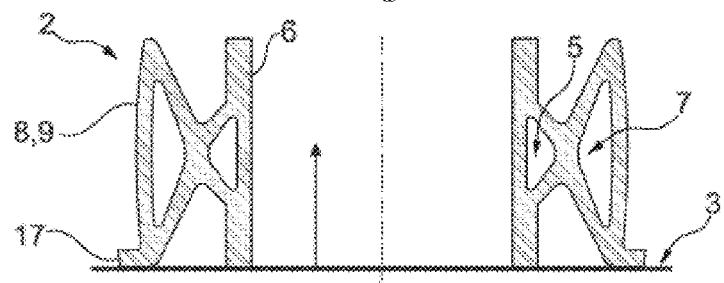
FIG. 15 shows a main body of a belt tensioning roller with a single rim.

During the generative production of the main body 2, it is constructed from a powdery material in a construction direction AR, starting from a support surface 3. All variants of the main body 2 are based on a basic shape GF, which is shown in FIG. 14 without any modifications. The central axis of the main body 2 is denoted by MA.

During operation of the belt tensioning roller 1, support forces AF arise by which the belt support wall 8 is loaded. Depending on the estimated magnitude of the support forces AF, the main body 2 has suitable reinforcements 9. The reinforcements 9 are in the form of reinforcing webs 14, 15 (FIGS. 1 to 12) or in the form of wall reinforcements (FIGS. 13 and 14 to 18). A combination of reinforced walls 4 and additional reinforcing webs 14, 15 is also possible. A set of belt tensioning rollers 1 comprises main bodies 2 reinforced in different ways, wherein a belt tensioning roller 1 with the main body 2 in a non-reinforced basic shape GF can also be part of the set.

In the embodiments according to FIGS. 1 to 10, reinforcing webs 15 can only be found in the outer cavity 7. Owing to the arrangement of the reinforcing webs 15 within the cavity 7, the term inner reinforcing webs 15 is used in this case. There are no reinforcing webs in the inner cavity 5 in any of the exemplary embodiments.

FIGS. 2, 4, 6, 8 and 10 show, in a completed arrangement, the reinforcing webs 15 of the associated main bodies 2 according to FIGS. 1, 3, 5, 7 and 9, which can be found on the left of the pages of the drawings. The width of each reinforcing web 14, 15 to be measured in the circumferential direction is indicated as BS in all cases. AS indicates the distance to be measured in the same direction between two adjacent reinforcing webs 14, 15.

Figure 2:
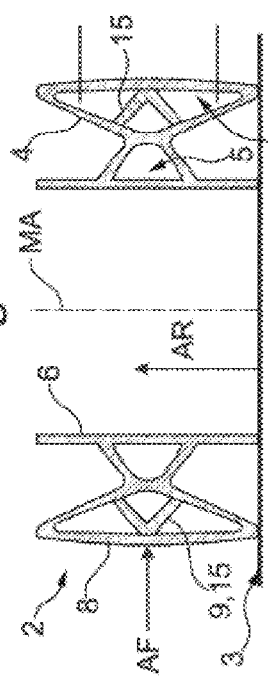
FIG. 2 shows the arrangement of reinforcing webs in the main body of the belt tensioning roller according to FIG. 1.

As suggested by FIGS. 1 and 2, there are various positions of reinforcing webs 15 within the outer cavity 7, wherein, in the circumferential direction of the outer cavity 7 and thus of the entire main body 2, not only the position of the reinforcing webs 15 in the axial direction alternates, but also their inclination. In the case of FIG. 1 and FIG. 2, an imaginary central plane of the belt tensioning roller 1, lying between the end faces of the main body 2, intersects all the reinforcing webs 15, wherein the individual reinforcing webs 15 are arranged alternately closer to the one end face and closer to the other end face of the main body 2.

Figure 3:
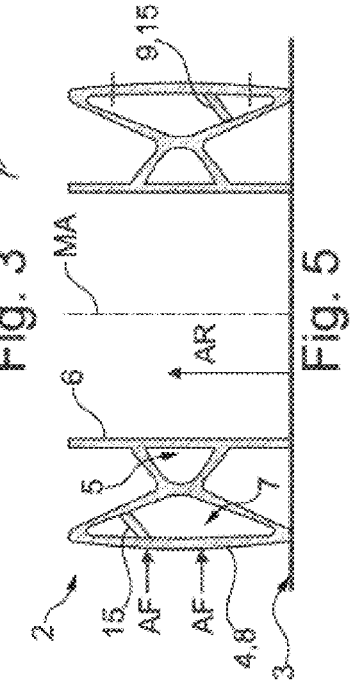
FIGS. 3 to 10 show further embodiments of main bodies of belt tensioning rollers in representations similar to FIGS. 1 and 2.
Figure 4:
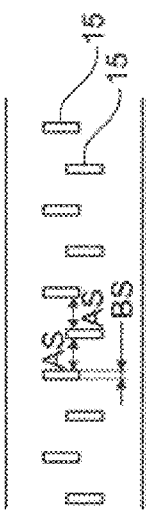

In the exemplary embodiment according to FIGS. 3 and 4, all reinforcing webs 15 have a uniform shape that is symmetrical with respect to the central plane of the main body 2, which appears as a V-shape in cross section. The additional material introduced in the form of the reinforcing webs 15 into the main body 2, compared to the basic shape GF, is larger in the case of FIGS. 3 and 4 than in the case of FIGS. 1 and 2.

Figure 5:
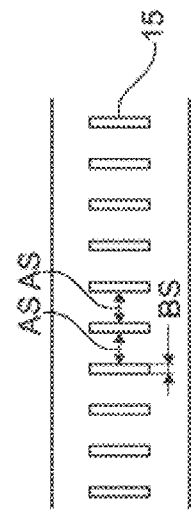
Figure 6:
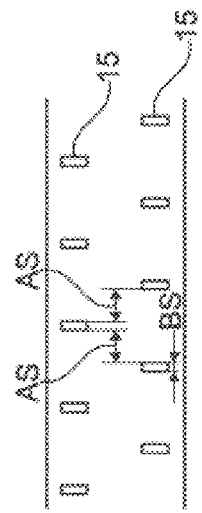

An even smaller increase in material than in the case of FIGS. 1 and 2 is given in the case of FIGS. 5 and 6. Here, the reinforcing webs 15 are located closer to the end faces of the main body 2, such that the central plane laid through the main body 2 does not intersect any of the reinforcing webs 15.

Figure 8:
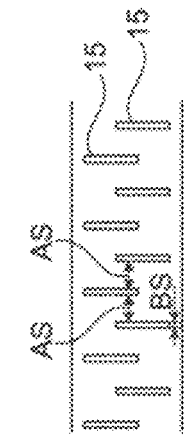
Figure 7:
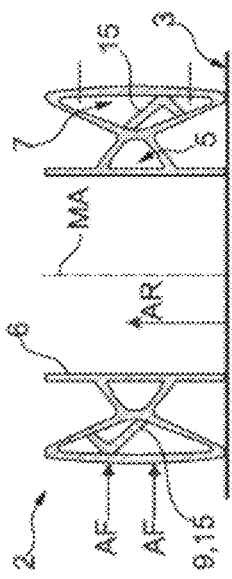

In the case of FIGS. 7 and 8 there is both an asymmetrical arrangement of the reinforcing webs 15 and a V-shape of each individual reinforcing web 15. The variant according to FIGS. 7 and 8 thus represents a fusion of the variants according to FIGS. 1 and 2 as well as 5 and 6 on the one hand and the variant according to FIGS. 3 and 4 on the other hand. In the case of FIGS. 7 and 8, each V-shaped reinforcing web 15 has two V-legs of different lengths.

Figure 10:
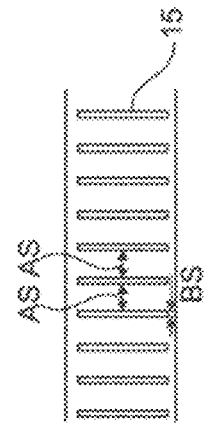
Figure 9:
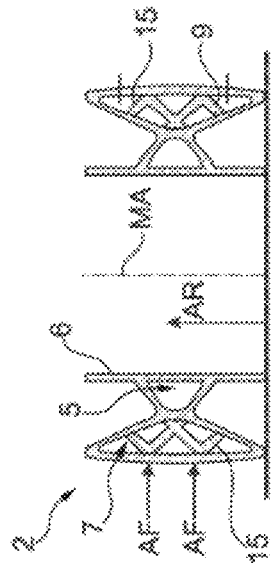

Asymmetrical V-shapes can also be seen in the reinforcing webs 15 of the variant according to FIGS. 9 and 10, in which case two V-shapes are fused to form a W-shaped reinforcing web 15.

Figure 12:
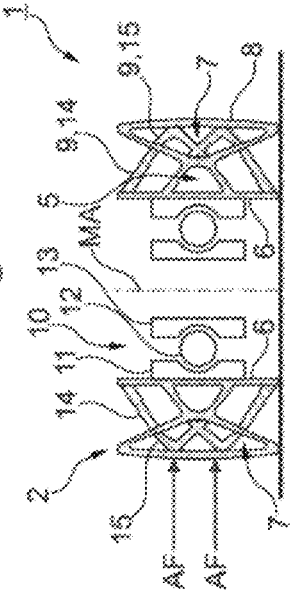
FIG. 12 shows a belt tensioning roller constructed from a rolling bearing and the main body according to FIG. 11.
Figure 11:
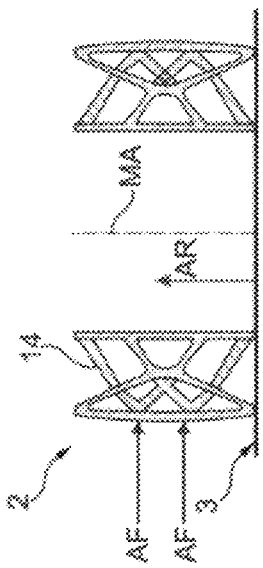
FIG. 11 shows a main body of a belt tensioning roller, which has additional outer reinforcing webs in comparison with the variants according to FIGS. 1 to 10.

The variant according to FIGS. 11 and 12 represents a modification of the design according to FIGS. 9 and 10, wherein, in addition to the inner reinforcing webs 15, outer reinforcing webs 14, which are located outside the cavities 5, 7, can be seen. From FIGS. 11 and 12 it can be seen that each outer reinforcing web 14 represents an extension of an inner reinforcing web 15.

Figure 16:
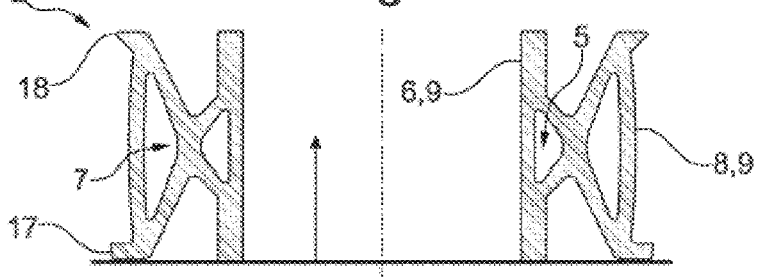
FIG. 16 shows a main body of a belt tensioning roller with two rims.

In each of the designs according to FIGS. 13 and 15 to 18, the reinforcements 9 are designed exclusively in the form of wall reinforcements. The design according to FIG. 15 differs from the design according to FIG. 13 by virtue of a rim 17 formed on one side. In the case of FIG. 16, there is also a second rim 18, the cross-sectional design of which differs from the rim 17.

Figure 13:
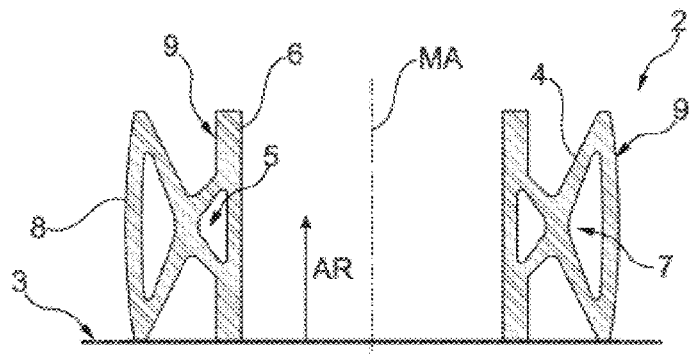
FIG. 13 shows a main body of a belt tensioning roller with increased wall thickness compared to the embodiments according to FIGS. 1 to 12.
Figure 17:
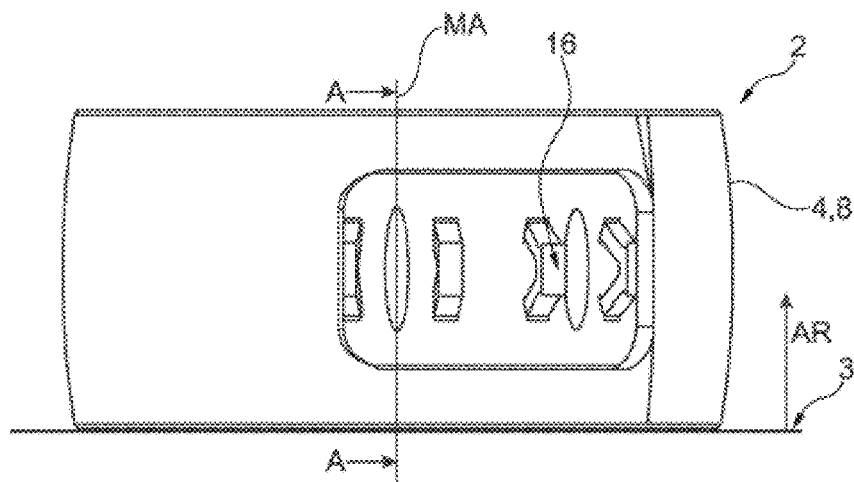
FIG. 17 shows a further main body of a belt tensioning roller in a perspective sectional view.
Figure 18:
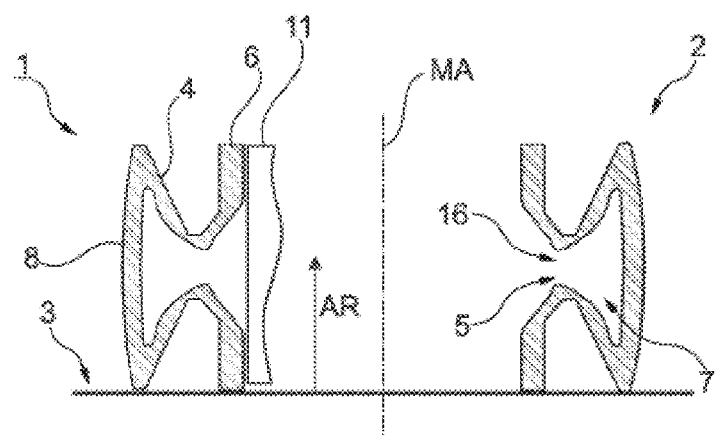
FIG. 18 shows the main body according to FIG. 17 in a sectional view.

The outer shape of the variant according to FIGS. 17 and 18 corresponds to the shape of the main body 2 according to FIG. 13. In addition, openings 16 in the main body 2 can be seen in FIGS. 17 and 18, which enable depowdering as part of the generative production. For the same purpose, openings can also be present in the main bodies 2 of the other variants already explained. It is also possible to design portions of the walls 4, in particular the wall section of the outer cavity 7 facing the inner wall 6, not as a closed surface, but as a grid. The same applies to wall sections of the inner cavity 5 facing away from the inner wall 6.

LIST OF REFERENCE SIGNS

1 Belt tensioning roller
2 Main body
3 Support surface
4 Wall
5 Inner cavity
6 Inner wall
7 Outer cavity
8 Belt support wall
9 Reinforcement
10 Rolling bearing
11 Outer ring
12 Rolling body
13 Inner ring
14 Outer reinforcing web
15 Inner reinforcing web
16 Opening in the main body
17 Rim
18 Rim
AF Support force
AR Construction direction
AS Distance between two webs
BS Width of a web
GF Basic shape
MA Central axis

The invention claimed is:

1. A set of belt tensioning rollers, comprising: a plurality of different main bodies which are provided to receive a rolling bearing held in an inner wall of the main body, wherein each main body has two cavities with a toroidal shape, wherein the two cavities comprise an outer cavity delimited by a belt support wall and an inner cavity delimited by the inner wall, wherein at least one of the main bodies comprises a reinforcement disposed in the outer cavity and comprises an additional reinforcement extending to the inner wall outside the two cavities, wherein the additional reinforcement is disposed in an extension of the reinforcement of the outer cavity.

2. The set of belt tensioning rollers according to claim 1, wherein the reinforcement comprises reinforcing webs which are formed alternately in a circumferential direction of the outer cavity.

3. The set of belt tensioning rollers according to claim 1, wherein at least one of the main bodies has a one-sided rim on the belt support wall thereof.

4. The set of belt tensioning rollers according to claim 1, wherein at least one of the main bodies has rims on both sides of the belt support wall thereof.

5. A method for producing a set of belt tensioning rollers comprising:
providing a powder material; and
generatively forming a plurality of main bodies of the set of belt tensioning rollers with the powder material, wherein the plurality of main bodies are provided to receive a rolling bearing held in an inner wall of the plurality of main bodies, wherein a respective main body is formed to include a reinforcement, an additional reinforcement, at least two cavities, and a depowdering opening, wherein the at least two cavities comprise an outer cavity delimited by a belt support wall and an inner cavity delimited by the inner wall, wherein the reinforcement is disposed in the outer cavity, wherein the additional reinforcement extends to the inner wall outside the at least two cavities and is disposed in an extension of the reinforcement of the outer cavity, wherein the depowdering opening is configured for removal of the powder material following formation of the respective main body.

6. The method according to claim 5, wherein each of the at least two cavities has a toroidal shape.

7. A belt tensioning device comprising:
one or more belt tensioning rollers, wherein a respective belt tensioning roller comprises a main body, wherein the main body is configured to receive a rolling bearing held in an inner wall of the main body, wherein the main body has two cavities including an outer cavity defined by a belt support wall and an inner cavity defined by the inner wall, wherein the main body has a reinforcement and an additional reinforcement, wherein the reinforcement of the main body is disposed in the outer cavity, wherein the additional reinforcement extends to the inner wall outside the two cavities and is disposed in an extension of the reinforcement of the outer cavity, wherein the main body includes an opening for removal of powder used to form the main body.

8. The belt tensioning device according to claim 7, wherein each cavity has a toroidal shape.

9. The belt tensioning device according to claim 7, wherein the reinforcement comprises a reinforcement web.

10. The belt tensioning device according to claim 7, wherein the reinforcement comprises multiple reinforcements formed alternately in a circumferential direction of the outer cavity within the outer cavity.

11. The belt tensioning device according to claim 7, wherein the main body comprises a one-sided rim on the belt support wall.

12. The belt tensioning device according to claim 7, wherein the main body comprises rims on both sides of the belt support wall.

* * * * *